United States Patent [19]

Muys et al.

[11] 3,995,066

[45] Nov. 30, 1976

[54] YEAST CONTAINING FOOD EMULSIONS

[75] Inventors: Gerard Tuynenburg Muys, Rotterdam; Cornelis Theodorus Verrips, Maassluis; Roger Theophile Sylvain van Gorp, Vlaardingen, all of Netherlands

[73] Assignee: Lever Brothers Company, New York, N.Y.

[22] Filed: Mar. 3, 1975

[21] Appl. No.: 554,607

[30] Foreign Application Priority Data

Mar. 7, 1974 United Kingdom............... 10302/74

[52] U.S. Cl.................................. 426/62; 426/33; 426/603
[51] Int. Cl.². .......................................... A23D 3/04
[58] Field of Search ............... 426/33, 62, 601, 603, 426/610, 613

[56] References Cited

UNITED STATES PATENTS

| | | | |
|---|---|---|---|
| 2,422,633 | 6/1947 | Petersen | 426/603 X |
| 2,872,465 | 2/1959 | Sims et al. | 426/610 X |
| 2,987,403 | 6/1961 | Tupper | 426/62 X |
| 3,782,967 | 1/1974 | Eriksen et al. | 426/62 |
| 3,904,767 | 9/1975 | Verrips et al. | 426/33 |

*Primary Examiner*—R. B. Penland
*Attorney, Agent, or Firm*—Kenneth F. Dusyn; James J. Farrell; Melvin H. Kurtz

[57] ABSTRACT

The invention provides emulsions, particularly margarine and low fat spreads of the water-in-oil type containing substantially non-lypolytic and non-proteolytic oxygen-consuming yeasts in a concentration of $10^3$ to $10^7$ cells per gram of emulsion, strains of Kluyveromyces lactis and Debaryomyces hansenii being particularly preferred.

6 Claims, No Drawings

YEAST CONTAINING FOOD EMULSIONS

The invention is particularly applicable to margarines containing vegetable fats of relatively high linoleic and linolenic acid content.

The present invention relates to yeast containing food emulsions, such as margarine, and food spreads of relatively low fat content of improved quality, and to processes for their preparation. The invention particularly relates to non-dairy food spreads, i.e. emulsions in which the fatty phase contains substantial proportions of vegetable fats and particularly essentially consists of vegetable fats.

In modern technology the microbiological deterioration of edible food emulsions is avoided especially by controlling the emulsion structure and preserving the aqueous phase.

Accepted microbiological standards for margarine (cf. "Margarine Today", Proceedings of a Seminar held at Dijon University under the chairmanship of Prof. Guy Clement, Leyden, E. J. Brill, 1970, p. 117) are e.g. as follows:

|  | freshly manufactured | after storage for 2 weeks/19° C |
|---|---|---|
| Non-lipolytic yeasts | < $10^2$ | no signif. increase |
| Lipolytic yeasts | < 5 | no signif. increase |

Although dairy products, e.g. butter, when prepared under inadequate microbiological safety conditions can, among other microorganisms, contain yeasts, in modern industrial food emulsion preparation the addition of yeasts has never been seriously considered, let alone advocated.

The present invention provides emulsions, especially margarines and food spreads of relatively low fat content comprising a fatty phase, a nutrient medium containing aqueous phase and edible, substantially non-lipolytic, non-proteolytic and non-pathogenic yeasts that substantially reduce the oxygen content of the emulsion within at most 10 days, the yeast being present in a concentration of $10^3$ to $10^7$ cells per gram of emulsion, preferably $2\times10^3$–$10^6$, particularly $5\times10^3$–$5\times10^5$ cells per gram of emulsion.

The acidity of the aqueous phase of the emulsion is of importance and its pH should preferably be within the range of pH 3 or 4 to 6.5 more preferably 4.0–6.0, particularly 4.2–5.2, since otherwise sufficient survival of the yeasts cannot be guaranteed. The presence of acetic acid at a concentration of 0.2 per cent or more of the aqueous phase should be avoided since thereby the activity of the yeasts is adversely affected.

Preferably edible yeasts are used which sufficiently survive in the emulsion for at least twenty or forty days, particularly at least sixty days, especially one hundred days or more, and which substantially reduce the oxygen content of the emulsion to an oxygen content which is at most 80%, preferably no more than 40%, particularly 10 or 5% less of the initial oxygen content, within at most 10, preferably at most 5 days after preparation of the emulsion.

A particular advantage of the emulsion of the present invention is that they can be prepared without strict requirements as regards oxygen-free processing and packaging and that nevertheless autoxidation of unsaturated fats is at least considerably reduced.

Furthermore, due to oxygen consumption by the yeasts, oils and fats that are more prone to autoxidation, e.g. vegetable fats containing 40% or more of unsaturated, particularly polyunsaturated fatty acid residues particularly linolenic acid residues, the latter e.g. in an amount of 2 or 3 per cent or more, can be used in larger quantities without seriously affecting the organoleptic properties of the ultimate product. The most dramatic improvement is achieved by preparing yeast-containing food spreads from a fatty phase containing 20 per cent or more, e.g. 25–95 per cent, of such vegetable fats, particularly unhydrogenated liquid oils like soybean oil.

The term "fat" is used in this specification to include fatty acid triglycerides which are solid at 20° C and are commonly described as fats as well as triglycerides which are liquid at that temperature and which are commonly described as "oils". The term "liquid oil", which is also used in this specification refers to triglycerides which are liquid at 5° C, preferably at 0° C. A "fatty phase" is a fat or fat blend which can include liquid oils and which is suitable as the sole fat blend in the emulsions of the invention. Similarly a "margarine fat" is a fat blend which can also contain liquid oils and which is suitable as the fatty phase in margarine. Unless stated otherwise, the terms "emulsion", "margarine", "food spread" etc. refer to emulsions of the invention and also suitable amounts of fat-soluble emulsifiers, e.g. partial fatty acid glycerides like monoglycerides, phosphatides, and fractions thereof, etc. and/or water-soluble emulsifiers, e.g. partial glycerides, phosphatides, egg yolk, protein etc. Such emulsions preferably are of the water-in-fat type.

Another advantage is that the emulsions of the invention are not detrimentally affected from an organoleptic point of view, which means that they do not obtain a "yeasty" taste and that the yeasts can keep the oxygen content sufficiently low at storage, even when insufficiently air-tight packs are used.

Still another advantage of the invention is that it can provide emulsions which can be packed in tins and that the pH of the emulsion is not detrimentally affected.

Moreover, by critically selecting between the various available strains that, as far as oxygen consumption and viability are concerned, are suitable for the purpose of the invention, strains have been found that upon storage develop a pleasant flavour in the emulsions of the invention.

The emulsions of the invention can contain salt; e.g. margarines or low fat spreads can be prepared which contain as much as about 12–15% of common salt in their aqueous phase without the viability of the yeasts being seriously affected. Sometimes an adaption of the yeast strains to the salted medium is beneficial or even needed.

Preferably the emulsions of the invention are of the water-in-oil type and contain 75–85 per cent by weight of a fatty phase (margarine); however, water-in-oil type emulsions of a fat content as low as 20 or 35–60 per cent, the so-called low-fat-spreads, are also included. A suitable nutrient medium containing aqueous phase is a milk-based aqueous phase which contains sugars and vitamins. Particularly an aqueous phase that contains milk, skim milk, buttermilk, whey, etc., if desired diluted with water, to a reduced sugar content, e.g. 0.1–1.5% by weight, to which essential grow factors have been added, e.g. citric acid and vitamins, and/or aqueous dispersions of vegetable proteins containing such grow factors can be applied in the emulsion of the present invention.

Suitably, such an aqueous phase further comprises various minor ingredients e.g. salt, acid flavours, and water-soluble emulsifiers.

A milk-based aqueous phase that has been bacteriologically soured is particularly preferred, since thereby a further organoleptical improvement can be achieved; suitably, the bacteriological sourng can be effected in a manner known per se with a suitable starter comprising lactobacillaceae strains, e.g. those marketed by the Danish firms of "Visby" under the trade-name "Probat' and Hansen under the trade-name "Syreveakker" and Streptococcus diacetilactis or "Marlac Culture", marketed by Marschall Dairy Laboratory Inc., U.S.A.

Particularly suitable are starters disclosed in British patent application No. 57,938/72.

Preferably yeasts are used that reduce the oxygen content within at most 10 or 5 days to a level of at most 5 or 10 per cent of the initial oxygen content.

Suitable yeasts are those which are edible, viable, oxygen-consuming and substantially non-lipolytic and substantially non-proteolytic, which means that upon storage the emulsions of the invention do not develop an unacceptable soapy, sour or bitter taste. Preferably the yeasts can convert one or more of the following sugars: lactose, glucose, fructose and galactose, and/or one or more of the following compounds: citric acid, pyruvic acid, lactic acid and their salts, e.g. alkali metal salts, or ethanol.

Yeasts have been selected from hundreds of available strains by culturing them on a substrate similar to or identical with the aqueous phase of the emulsion of the invention, and by preparing margarines therefrom. The cultured aqueous phase and the emulsion prepared therefrom was organoleptically assessed and the oxygen consumption of the yeasts measured.

Suitable yeasts are for instance: (classified according to J. Lodder, "The Yeasts", 1970, North Holland Publishing Company, Amsterdam-London, 2nd rev. Edition) *Kluyveromyces lactis, Debaryomyces hansenii, Kluyveromyces marxianus, Leucosporidium frigidum, Kluyveromyces bulgaricus, Pichia ohmeri, Saccharomyces rosei, Candida kefyr, Saccharomyces kluyveri, Metschnikowia pulcherrima, Wickerhamii fluorescens, Candida sake, Saccharomyces cerevisiae, Torulopsis candida, Candida vini, Candida intermedia, Debaryomyces tamarii, Dekkera intermedia, Hansenula anomala, Kluyveromyces aestuarii, Kluyveromyces cicerisporus, Pichia farinosa, Saccharomyces cidri, Saccharomyces diastaticus, Saccharomyces saitoanus, Torulopsis holmii, Wingea robertsii, Kluyveromyces lodderii, Kluyveromyces phaffii, Candida macedoniensis, Saccharomyces baillii, Pichia membranae faciens* and *Saccharomyces uvarum.*

Preferably the following yeasts are used: *Kluyveromyces lactis, Debaryomyces hansenii, Kluyveromyces marxianus, Leucosporidium frigidum, Kluyveromyces bulgaricus, Pichia ohmeri, Saccharomyces rosei, Candida kefyr, Saccharomyces kluyveri, Metschnikowia pulcherrima, Wickerhamii fluorescens, Candida sake, Saccharomyces cerevisiae, Torulopsis candida, Candida vini, Candida intermedia, Debaryomyces tamarii, Dekkera intermedia, Hansenula anomala, Kluyveromyces aetuarii, Kluyveromyces cicerisporus, Pichia farinosa, Saccharomyces cidri, Saccharomyces diastaticus, Saccharomyces saitoanus, Torulopsis holmii,* and *Wingea robertsii,* and particularly strains of the following genera: *Kluyveromyces lactis, Debaryomyces hansenii, Kluyveromyces marxianus, Leucosporidium frigidum, Kluyveromyces bulgaricus, Pichia ohmeri, Saccharomyces rosei, Candida kefyr, Saccharomyces kluyveri, Metschnikowia pulcherrima, Wickerhamii fluorescens* and *Candida sake.*

The best results have been obtained with the first seven genera of the last-mentioned group.

The yeasts which are especially preferred are oxygen-consuming strains from yeasts naturally occurring in cheese, e.g. French types like Brie and Camembert, such as *Kluyveromyces lactis* and *Debaryomyces hansenii.* The last-mentioned strains, which have been deposited at the "Centraal Bureau voor Schimmelcultures, afd. Gisten" at Delft, The Netherlands, under Nos. CBS 6594, 6595, 6596, 6597, 6598, 6603, 6604, 6605, 6606, 6607, 6608, 6609 and 6747, not only decrease the oxygen content of the emulsion but also impart a pleasant taste to it.

Other suitable strains have been deposited at the same institute as well; their reference numerals appear in the accompanying tables.

The yeasts can be incorporated in the emulsions at any stage of the production in a manner known per se, provided that at least the majority survives the processing of the emulsion and that the oxygen-consuming characteristics of the yeasts are not dramatically affected. Preferably the yeasts are added to the aqueous phase before it is emulsified with the fatty phase. Particularly a freshly prepared aqueous yeast dispersion, i.e a yeast dispersion in which a substantial proportion of the yeast cells, e.g. 80 or 90% or more, is in their late logarithmic phase or their early stationary phase, is directy emulsified with the fatty phase. Such yeast dispersion or concentrates thereof can also, if desired, be stored under suitable low temperature conditions and later be incorporated in emulsions.

Alternatively the yeasts are dispersed in a suitable nutrient medium containing aqueous phase, e.g. part of the aqueous phase of the emulsion, which after emulsification of the fatty phase and the remainder of the aqueous phase, is injected into the emulsion so obtained, under conditions which result in a relatively coarse partition of the yeast-containing droplets in the emulsion of the invention.

The yeast can be cultured batchwise or continuously at temperatures of about 30°–40° C, preferably 15°–30° C, both in an oxygen-free and an oxygen-containing atmosphere, preferably in a medium that is similar to that which is used as aqueous phase of the emulsion of the invention.

Excellent oxygen-consuming yeast biomasses are obtained when the yeast strains are cultured on a substrate, e.g. skim milk diluted with water to a sugar content of no more than about 1.5%, to which essential grow factors, e.g. citric and vitamins have been added which substrate is aerated, preferably with a gas of high oxygen content. For instance yeasts are cultured according to the invention at a temperature of 10°–40° C, e.g. 25° C, by adding about $10^6$ yeasts per gram substrate and aerating it with oxygen until after 18–24 hours about $10^8$ yeasts are present.

An amount of the cultured yeasts is added to a suitable aqueous phase, e.g. bacteriologically or chemically acidified milk, at such a concentration that the emulsion prep ared therefrom contains $10^2$–$10^7$, preferably about $10^5$ cells/gram emulsion.

The invention will now be illustrated by the following examples.

EXAMPLES I – XIII

Margarines were prepared from 82 per cent by weight of a freshly refined fat blend consisting of:
60 parts by weight of slightly hydrogenated soyabean oil (percentage of linoleic acid 28%, linolenic acid 2.5%)
10 parts by weight of fully hydrogenated palm oil
15 parts by weight of coconut oil
15 parts by weight of sunflower oil (percentage of linoleic acid 65%
and 18 per cent by weight of an aqueous phase.

The aqueous phase was prepared as follows:
50 parts of bacteriologically acidified (Probat) skim milk were mixed with 50 parts of water; the pH value was 4.5.

A selected and cultured yeast suspension in skim milk containing $10^8$ cells per gram of milk, was added to the aqueous phase until the desired concentration per gram of margarine was obtained.

The yeasts were cultured as follows:
$10^6$ cells were added per gram of skim milk of a temperature of 25° C. Air was supplied while stirring for 18–24 hours until a concentration of $10^8$ cells per gram of milk was obtained.

The margarines were prepared by dispersing the aqueous phase of a temperature of 8° C in a melted fat blend of a temperature of 45° C, using the process described in British patent specification No. 765,870.

The yeast strains present in the aqueous phase, their origin, the concentration, their morphologic properties etc. are compiled in Table I. The results of the experiments are also indicated in said Table.

The flavour impression was organoleptically assessed.

The oxygen consumption was measured as follows:
The oxygen content of the margarine was polarographically measured by means of a Clark cell at 35° C (cf. Fette, Seifen, Anstrichmittel 68 (1966) 135–139) connected to a Radiometer pH meter 27 GM with Gas Monitor PHA 927 b, PHM 72 MK 2 (Radiometer A/S, Copenhagen, Denmark).

The cell was calibrated as follows:
0% $O_2$ : saturated aqueous $Na_2SO_3$ solution
100% $O_2$ : sunflower oil of 35° C saturated with air.

The oxygen consumption of the yeast in the margarine was determined in a sample taken from the packed margarine which was immediately brought to about 30° C and measured with the Clark cell.

The oxygen content was measured as a function of the time and expressed in percentages of maximum content.

Similar results were obtained when the slightly hydrogenated soyabean oil was replaced by unhydrogenated soyabean oil, containing 55% linoleic and 8% linolenic acid and also when the aqueous phase was prepared from a bacteriologically acidified suspension of 6% whey powder in water (ph 4.6), even when the fat content was reduced to 40% by weight.

EXAMPLES XIV – XLIV

Margarines were prepared as described in the previous examples, except that other yeast strains were added and that the water phase was prepared as follows:
20% by weight of bacteriologically soured skim milk was mixed with 80% by weight of water (the pH value was 4.5); and that the margarines of examples XXIII-XXVIII were prepared from a fat blend containing:
45% of sunflower oil,
30% of soyabean oil,
13% of a fully hydrogenated hard fat, and
12% of safflower oil.

The fatty phase of the emulsion prepared according to example XV was of a temperature of 33° C.

The results are compiled in Table II.

Similar results were obtained in margarines containing 40, 50 and even 75% of unhydrogenated soyabean oil.

EXAMPLE XLV

EXAMPLE I was repeated, except that the yeasts were cultured in the following substrate:
10 grams of skim milk (pasteurized)
100 grams of water containing 1% of sodium citrate, and that the yeasts were cultured while supplying oxygen in an amount of 1N1 oxygen per liter medium per minute.

The vitamin and mineral composition of the substrate was adjusted to that normally occurring in milk.

The oxygen content in the margarine prepared from the cultured yeast suspension was reduced to zero already two days after production.

TABLE 1

| Example No. | yeast strain number | origin (French cheese) | initial concentration in margarine cells/gram | concentration in margarine after 60 days'storage at 15° C cells/gram | morphologic properties ||||||| lipolytic activity | proteolytic activity |
|---|---|---|---|---|---|---|---|---|---|---|---|---|
| | | | | | fermentation ||| assimilation ||| | |
| | | | | | lactose | glucose | galactose | lactose | glucose | galactose | | |
| 1 | 65 | Camembert+ | $4 \times 10^4$ | $1 \times 10^4$ | neg | weak | weak | weak | pos | pos | neg | neg |
| 2 | 223 | Camembert | $3.0 \times 10^4$ | $5,1 \times 10^5$ | neg | weak | weak | weak | pos | pos | neg | neg |
| 3 | 309 | Camembert | $9.0 \times 10^4$ | $1 \times 10^5$ | pos | pos | pos | pos | pos | pos | neg | neg |
| 4 | 314 | Camembert | $4 \times 10^4$ | $2,1 \times 10^5$ | pos | pos | pos | pos | pos | pos | neg | neg |
| 5 | 325 | Camembert+ | $9 \times 10^4$ | $1,5 \times 10^4$ | pos | pos | pos | pos | pos | pos | neg | neg |
| 6 | 380 | Camembert | $4 \times 10^4$ | $1 \times 10^3$ | pos | pos | pos | pos | pos | pos | neg | neg |
| 7 | 390 | Camembert⁻ | $9 \times 10^4$ | $2 \times 10^4$ | pos | pos | pos | pos | pos | pos | neg | neg |
| 8 | 401 | Camembert· | $2 \times 10^4$ | $6,5 \times 10^4$ | pos | pos | pos | pos | pos | pos | neg | neg |
| 9 | 510 | Camembert⁻ | $2.5 \times 10^4$ | $6,5 \times 10^4$ | pos | pos | pos | pos | pos | pos | neg | neg |
| 10 | 519 | Camembert+ | $5 \times 10^4$ | $6 \times 10^4$ | pos | pos | pos | pos | pos | pos | neg | neg |
| 11 | 526 | Camembertx | $10^5$ | $4 \times 10^5$ | pos | pos | pos | pos | pos | pos | neg | neg very weak |
| 12 | 549 | Camembert | $9 \times 10^4$ | $< 10^3$ | neg | pos | pos | pos | pos | pos | weak | weak |
| 13 | 556 | Brie⁻ | $1 \times 10^5$ | $1,6 \times 10^5$ | pos | pos | pos | pos | pos | pos | neg | neg |

| Ex- | deposited at "Centraal Bureau voor Schimmelcultures afd. Gisten" at | oxygen consumption in margarine, % of the initial oxygen content |

TABLE 1-continued

| ample No. | genera | Delft, The Netherlands number | after 10 days' storage |
|---|---|---|---|
| 1 | *Debaryomyces hansenii* | CBS 6603 | <20 |
| 2 | same | CBS 6604 | 40 |
| 3 | *Kluyveromyces lactis* | CBS 6594 | 0 |
| 4 | same | CBS 6605 | 0 |
| 5 | same | CBS 6747 | 0 |
| 6 | same | CBS 6606 | 25 |
| 7 | same | CBS 6607 | 0 |
| 8 | same | CBS 6595 | 5 |
| 9 | same | CBS 6608 | 8 |
| 10 | same | CBS 6609 | 0 |
| 11 | same | CBS 6596 | 0 |
| 12 | *Candida intermedia* | CBS 6597 | 0 |
| 13 | *Kluyveromyces lactis* | CBS 6598 | 0 |

¯flavour impression of margarine: fresh, butterlike
⁺flavour impression of margarine: pleasant, fruity
· fresh, pleasant
ₓapple-like
pos = positive
neg = negative

TABLE II

| Example No. | yeast strain number | origin (French cheese) | initial concentration in margarine cells/gram | concentration in margarine after 60 days' storage at 15° C cells/gram | fermentation lactose | fermentation glucose | fermentation galactose | assimilation lactose | assimilation glucose | assimilation galactose | lipolytic activity | proteolytic activity |
|---|---|---|---|---|---|---|---|---|---|---|---|---|
| 14 | 742 | no | $9 \times 10^4$ | $5.10^4$(after 40 days) | neg(or w) | pos | pos | pos | pos | pos | neg | neg |
| 15 | 780 | no | $10^5$ | $9.10^4$ | neg | pos | pos | pos | pos | pos | neg | neg |
| 16 | 736 | no | $10^5$ | $10^5$ | pos or neg | pos | pos | pos | pos | pos | neg | neg |
| 17 | 291 | Camembert | $10^5$ | $1.5 . 10^4$ | neg | pos | pos | neg | pos | pos | neg | neg |
| 18 | 581 | Brie | $10^5$ | $10^5$ | neg | pos | neg | neg | pos | neg | neg | neg |
| 19 | 691 | no | $6 \times 10^4$ | $3.6 \times 10^4$ | pos | pos | pos | pos | pos | pos | neg | neg |
| 20 | 661 | no | $5 \times 10^4$ | $5.5 \times 10^4$ | neg | pos | pos | neg | pos | pos | neg | neg |
| 21 | 710 | no | $9 \times 10^4$ | $1.6 . 10^5$ | neg | pos | vw | neg | pos | pos | neg | neg |
| 22 | 782 | no | $10^5$ | $3.10^4$(after 20 days) | neg | pos | pos | neg | pos | pos | neg | neg |
| 23 | 692 | no | $1.5 \times 10^5$ | $1 \times 10^4$ | neg | pos/w | pos/w | neg | pos | pos | neg | neg |
| 24 | 13 | Brie | $7 \times 10^4$ | $7.10^4$ | neg | pos | pos | neg | pos | pos | neg | vw |
| 25 | 128 | Brie | $5 \times 10^4$ | $10^6$ | neg | vw | neg | pos/neg | pos | pos | neg | neg |
| 26 | 370 | Camembert | $10^5$ | $2.10^6$ | neg | neg | neg | neg | pos | neg | neg | vw |
| 27 | 549 | Camembert | $8 \times 10^4$ | $2.10^5$ | neg | pos | pos | pos | pos | pos | neg | neg |
| 28 | 774 | no | $8 \times 10^4$ | < 5 | pos | pos | pos | pos | pos | pos | neg | neg |
| 29 | 777 | no | $3 \times 10^4$ | $2.10^5$ | neg | pos | neg | neg | pos | pos | neg | neg |
| 30 | 671 | no | $7.5 \times 10^4$ | $3.6 \times 10^4$ | neg | pos | pos | neg | pos | pos | neg | neg |
| 31 | 743 | no | $10^5$ | $9.10^4$ | neg | pos | neg | pos | pos | pos | neg | neg |
| 32 | 730 | no | $8 \times 10^4$ | $2.8 \times 10^4$ | pos or neg | pos | pos | pos | pos | pos | neg | neg |
| 33 | 652 | no | $1.5 \times 10^5$ | $2 \times 10^6$ | neg | pos | pos | pos or neg | pos | pos | neg | neg |
| 34 | 762 | no | $10^5$ | $1.8 \times 10^5$(35 days) | neg | pos | pos | neg | pos | pos | neg | neg |
| 35 | 662 | no | $4 \times 10^4$ | $5.10^4$ | neg | pos | pos | neg | pos | pos | neg | neg |
| 36 | 765 | no | $9 \times 10^4$ | $5.6 \times 10^3$ | neg | pos | pos | neg | pos | pos | neg | neg |
| 37 | 681 | no | $4 \times 10^4$ | $9 \times 10^4$ | neg | pos | pos | neg | pos | pos | neg | neg |
| 38 | 783 | no | $10^4$ | $10^5$ | neg | pos | neg | pos | pos | neg | neg | neg |
| 39 | 786 | no | $10^5$ | $6.9 \times 10^4$(15 days) | neg | pos | pos | neg | pos | pos | neg | neg |
| 40 | 787 | no | $3.9 \times 10^4$ | $7.3 \times 10^4$(15 days) | neg | pos | pos | neg | pos | pos | neg | neg |
| 41 | 785 | no | $8.5 \times 10^4$ | $1.3 \times 10^5$(15 days) | neg | pos | pos | neg | pos | pos | neg | neg |
| 42 | 586 | no | $9 \times 10^4$ | $2.6 \times 10^5$ | neg | pos | neg | neg | pos | neg/pos | neg | neg |
| 43 | 585 | no | $7 \times 10^4$ | $3.0 \times 10^4$ | neg | pos | neg | neg | pos | neg | neg | neg |
| 44 | 587 | no | $8 \times 10^4$ | $7.1 \times 10^4$ | neg | pos | pos | neg | pos | pos | neg | neg |

| Example No. | genera | deposited at Centraal Bureau voor Schimmelcultures, afd. Gisten, at Delft, the Netherlands number : (CBS) | oxygen consumption in margarine, % of the initial oxygen content after 10 days' storage |
|---|---|---|---|
| 14 | *Kluyveromyces marxianus* | 4 3 5 4 | 0 |
| 15 | *Luecosporidium frigidum* | 5 2 7 0 | 0 |
| 16 | *Kluyveromyces bulgaricus* | 5 6 6 8 | 0 |
| 17 | *Pichia ohmeri* | 6 7 4 6 | 0 |
| 18 | *Saccharomyces rosei* | 6 7 4 9 | 0 |
| 19 | *Candida kefyr* | 8 3 4 | 2.6 |
| 20 | *Saccharomyces kluyveri* | 3 0 8 2 | 0 |
| 21 | *Metschnikowia pulcherrima* | 5 8 3 3 | 0 |
| 22 | *Wickerhamil fluorescens* | 4 5 6 5 | 0 |
| 23 | *Candida sake* | 1 5 9 | 0 |
| 24 | *Saccharomyces cerevisiae* | 6 7 4 4 | 28 |
| 25 | *Torulopsis candida* | 6 7 4 5 | 15 |
| 26 | *Candida vini* | 6 7 4 8 | 45 |
| 27 | *Candida Intermedia* | 6 5 9 7 | 24 |
| 28 | *Debaryomyces tamarii* | 4 3 3 3 | 0.5 |
| 29 | *Dekkera intermedia* | 4 9 1 4 | 15 |
| 30 | *Hansenula anomala* | 5 7 5 9 | 11 |

TABLE II-continued

| | | | | | | |
|---|---|---|---|---|---|---|
| 31 | Kluyveromyces aestuarii | 4 | 9 | 0 | 4 | 80 |
| 32 | Kluyveromyces cicerisporus | 1 | 5 | 5 | 4 | 11 |
| 33 | Pichia farinosa | | 1 | 8 | 5 | 6 |
| 34 | Saccharomyces cidri | 2 | 9 | 5 | 1 | 3.5 |
| 35 | Saccharomyces diastaticus | 1 | 7 | 8 | 2 | 50 |
| 36 | Saccharomyces saitonaus | | 7 | 0 | 5 | 0 |
| 37 | Torulopsis holmii | | 1 | 3 | 5 | 40 |
| 38 | Wingea robertsii | 2 | 9 | 3 | 4 | 60 |
| 39 | Kluyveromyces lodderii | 2 | 7 | 5 | 7 | 2 (14 days) |
| 40 | Kluyveromyces phaffii | 4 | 4 | 1 | 7 | 45 (ibid) |
| 41 | Candida macedoniensia | | 6 | 0 | 0 | 1 (ibid) |
| 42 | Saccharomyces baillii | 6 | 7 | 5 | 0 | 5 |
| 43 | Pichia membranaefaciens | 6 | 7 | 5 | 2 | 2 |
| 44 | Saccharomcyes uvarum | 6 | 7 | 5 | 1 | 12 | w = weak
vw = very weak

We claim:

1. An emulsion of the water-in-oil type comprising a fatty phase containing vegetable fats, a milk-based aqueous phase of a pH of 3.5 to 6 containing edible, viable, substantially non-lipolytic, non-proteolytic and non-pathogenic yeasts that survive in the emulsion for at least twenty days from the time of the emulsion preparation and which reduce the oxygen content of the emulsion within at most 10 days from its preparation to an oxygen content which is at most 80% of the initial oxygen content, said yeasts being present in a concentration of $10^3$ to $10^7$ cells per gram of emulsion and being selected from the group consisting of *Kluyveromyces lactis, Debaryomyces hansenii, Kluyveromyces marxianus, Leucosporidium frigidum, Kluyveromyces bulgaricus, Pichia ohmeri, Saccharomyces rosei, Candida kefyr, Saccharomyces kluyveri, Metschnikowia pulcherrima, Wickerhamii fluorescens, Candida sake, Saccharomyces cerevisiae, Torulopsis candida, Candida vini, Candida intermedia, Debaryomyces tamarii, Dekkera intermedia, Hansenula anomala, Kluyveromyces aestuarii, Kluyveromyces cicerisporus, Pichia farinosa, Saccharomyces cidri, Saccharomyces diastaticus, Saccharomyces saitonanus, Torulopsis holmii, Wingea robertsii, Kluyveromyces lodderii, Kluyveromyces phaffii, Candida macedoniensis, Saccharomyces baillii, Pichia membranaefaciens* and *Saccharomyces uvarum*.

2. An emulsion according to claim 1, which is a water-in-oil emulsion of a fat content of 75 to 85 per cent by weight.

3. An emulsion according to claim 1, comprising soyabean oil.

4. An emulsion according to claim 1, comprising a milk selected from the group consisting of milk, skimmilk, buttermilk and whey.

5. An emulsion according to claim 1, comprising strains from *Kluyveromyces lactis*.

6. An emulsion according to claim 1, comprising strains from *Debaryomyces hansenii*.

* * * * *